Patented Sept. 2, 1930

1,774,523

UNITED STATES PATENT OFFICE

JAMES B. PIERCE, JR., OF CHARLESTON, WEST VIRGINIA, ASSIGNOR TO BARIUM REDUCTION CORPORATION, OF CHARLESTON, WEST VIRGINIA, A CORPORATION OF DELAWARE

BARIUM CARBONATE AND SODIUM SULPHYDRATE MANUFACTURE

No Drawing.   Application filed January 29, 1927.   Serial No. 164,660.

This invention relates to the manufacture of barium carbonate and sodium sulphydrate, and has for its object the provision of certain improvements in the manufacture of these compounds.

In my prior Patent, No. 1,634,338, I have described an improved method of making barium carbonate and barium sulphydrate by introducing substantially pure carbon dioxide gas into a hot aqueous solution of barium sulfide until substantially one-half of the barium originally present as barium sulfide has been converted into barium sulphydrate, the remainder of the barium present being precipitated as substantially pure barium carbonate. The barium carbonate precipitate is washed, filter-pressed, dried and disintegrated, and when ready for market weighs approximately 52 pounds per cubic foot. For many purposes, a denser barium carbonate product is desired, and one of the aims of the present invention is the production of a barium carbonate product of greater apparent specific gravity than is obtained in the process of my aforementioned application. By density as herein used I mean the weight per cubic foot of the finished material, or apparent specific gravity, and not the real density or specific gravity which is the same for all barium carbonate, i. e., about 4.2 at 15° C.

The present invention is based on my discovery that a finished barium carbonate product of relatively high weight per cubic foot can be obtained when substantially pure carbon dioxide gas is introduced into hot mixed aqueous solutions of barium sulfide and sodium, or equivalent alkali metal, sulfide. In carrying out the invention, I first mix a hot aqueous solution of barium sulfide, preferably of about 15 to 20% strength, with an equimolecular quantity of a hot aqueous solution of sodium sulfide, preferably of about 10 to 20% strength. I then pass substantially pure carbon dioxide gas into the mixture until all of the barium is precipitated as barium carbonate according to the following reaction:

$2BaS + 2H_2O = Ba(OH)_2 + Ba(SH)_2$

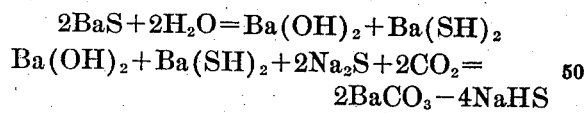

The mixed solutions of barium sulfide and sodium sulfide should preferably be maintained at a temperature above 60° C., as otherwise some barium bicarbonate may form. Furthermore, barium hydrate may precipitate from the mixed solutions unless the temperature is maintained above 60° C.

The precipitate of barium carbonate is allowed to settle, and the top liquor of sodium sulphydrate is then decanted off. The barium carbonate precipitate is washed with pure water, especially as free from sulfates as possible, until substantially all of the sodium sulphydrate has been removed. The washed barium carbonate is then filtered, dried and disintegrated when it is ready for market. The finished barium carbonate product prepared in this manner has a weight of about 67 pounds per cubic foot.

The sodium sulphydrate liquor may be evaporated to suitable strength and marketed in liquid form. Or the evaporation may be continued until the sodium sulphydrate is in solid form, in which condition it is ready for marketing.

The carbon dioxide gas used in practicing the invention should be substantially pure, and especially free from oxygen or other impurities capable of reacting with barium sulfide. The barium sulfide solution or liquor is preferably prepared by leaching crude barium sulfide ash with water. It will of course be understood that other alkali-metal sulfides may, if desired, be used in place of sodium sulfide.

I claim:—

1. The method of manufacturing barium carbonate and sodium sulphydrate which comprises subjecting a mixture in about equimolecular proportions of an aqueous solution of barium sulfide and an aqueous solution of sodium sulfide while maintained at a temperature above 60° C. to the action of substantially pure carbon dioxide gas until substantially all of the barium present has been precipitated as barium carbonate and substantially all of the sodium present has been converted into sodium sulphydrate, then discontinuing the action of the carbon dioxide gas on the mixture and separating the barium carbonate precipitate from the sodium sulphydrate liquor of the reaction mixture.

2. The method of manufacturing barium carbonate of relatively high density which comprises subjecting a mixture in about equimolecular proportions of an aqueous solution of barium sulfide and an aqueous solution of sodium sulfide while maintained at a temperature above 60° C. to the action of substantially pure carbon dioxide gas, discontinuing the action of the carbon dioxide gas on the mixture when substantially all of the barium present has been precipitated as barium carbonate, separating the barium carbonate precipitate from the liquor of the reaction mixture, and drying and disintegrating the separated precipitate and thereby obtaining a barium carbonate product of relatively high density.

3. The method of manufacturing an alkali-metal sulphydrate which comprises subjecting mixed aqueous solutions of barium sulfide in about equimolecular proportions and an alkali-metal sulfide in about equimolecular proportion to the action of carbon dioxide gas until substantially all of the alkali-metal present has been converted into alkali-metal sulphydrate with the attendant precipitation of barium carbonate, then discontinuing the action of the carbon dioxide gas on the mixture and separating the resulting alkali-metal sulphydrate from the barium carbonate precipitate.

4. The method of manufacturing sodium sulphydrate which comprises mixing in about equimolecular proportions aqueous solutions of barium sulfide and sodium sulfide, passing carbon dioxide gas through the mixed solutions until substantially all the sodium sulfide is converted into sodium sulphydrate and then discontinuing the passing of carbon dioxide gas through the mixed solutions.

5. The method of manufacturing barium carbonate and sodium sulphydrate which comprises mixing in about equimolecular proportions aqueous solutions of barium sulfide and sodium sulfide, passing carbon dioxide gas through the mixed solutions until substantially all of the barium is precipitated as barium carbonate and substantially all of the sodium sulfide has been converted into sodium sulphydrate, then discontinuing the passing of carbon dioxide through the mixed solutions and separating the barium carbonate precipitate and sodium sulphydrate liquor.

In testimony whereof I affix my signature.

JAMES B. PIERCE, Jr.